US010679680B2

(12) United States Patent
Fitzgerald et al.

(10) Patent No.: US 10,679,680 B2
(45) Date of Patent: Jun. 9, 2020

(54) METHOD AND APPARATUS WITH MULTIPLE CAVITIES

(71) Applicant: Seagate Technology LLC, Cupertino, CA (US)

(72) Inventors: David G. Fitzgerald, Lafayette, CO (US); David Ray Lapp, Boulder, CO (US); Jeffrey James Croxall, Boulder, CO (US); Robert M. Gibbs, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 645 days.

(21) Appl. No.: 14/881,983

(22) Filed: Oct. 13, 2015

(65) Prior Publication Data
US 2017/0101202 A1 Apr. 13, 2017

(51) Int. Cl.
*G11B 33/14* (2006.01)
*G11B 33/02* (2006.01)
*G11B 25/04* (2006.01)

(52) U.S. Cl.
CPC ........ *G11B 33/1466* (2013.01); *G11B 25/043* (2013.01); *G11B 33/027* (2013.01)

(58) Field of Classification Search
None
See application file for complete search history.

(56) References Cited

U.S. PATENT DOCUMENTS

| 4,367,503 A | * | 1/1983 | Treseder | G11B 17/038 360/133 |
| 6,392,838 B1 | * | 5/2002 | Hearn | G11B 25/043 29/603.03 |
| 6,567,237 B2 | | 5/2003 | Iwahara et al. | |
| 7,218,473 B2 | | 5/2007 | Bernett et al. | |
| 7,362,540 B2 | * | 4/2008 | Repphun | G11B 33/121 360/97.18 |
| 7,362,541 B2 | * | 4/2008 | Bernett | G11B 33/1466 360/99.21 |
| 7,876,528 B2 | * | 1/2011 | Uefune | G11B 25/043 360/97.22 |

(Continued)

FOREIGN PATENT DOCUMENTS

| JP | 62071078 A | * | 4/1987 |
| JP | 62175986 A | * | 8/1987 |

(Continued)

OTHER PUBLICATIONS

"Magnetic Disk Device" (Machine translation)—Kono, Takashi et al., Mar. 12, 1993, JP 05062446 A. (Year: 1993).*

*Primary Examiner* — William J Klimowicz
(74) *Attorney, Agent, or Firm* — Faegre Drinker Biddle & Reath

(57) ABSTRACT

Certain exemplary aspects of the present disclosure are directed towards dual cavity apparatus and related methods involving hermetically sealing the cavities by evacuating and atmosphere therein, filling the cavity with a gas, and sealing the gas in the cavities. This evacuation and fill approach is carried out through openings that provide access to the cavities. During evacuation of at least one of the cavities through one of the openings, one or more spacers prevent the cavity from collapsing in response to the vacuum force.

17 Claims, 4 Drawing Sheets

(56) References Cited

U.S. PATENT DOCUMENTS

| | | | | |
|---|---|---|---|---|
| 8,094,408 B2* | 1/2012 | Uefune | ............... | G11B 33/148 360/99.21 |
| 8,248,724 B2* | 8/2012 | Hayakawa | ......... | G11B 33/1486 360/97.12 |
| 8,564,900 B2 | 10/2013 | Hirono et al. | | |
| 8,659,849 B2* | 2/2014 | Hayakawa | ........... | G11B 33/148 360/97.22 |
| 8,760,797 B1* | 6/2014 | Beatty | ............... | G11B 33/1486 360/97.12 |
| 8,797,676 B2* | 8/2014 | Maeda | .................. | G11B 33/08 360/97.12 |
| 8,854,766 B1 | 10/2014 | Gustafson et al. | | |
| 9,001,458 B1* | 4/2015 | Vitikkate | ........... | G11B 25/043 360/97.22 |
| 9,570,114 B1* | 2/2017 | Sudo | .................. | G11B 33/1486 |
| 9,612,629 B2* | 4/2017 | Hirano | .................... | G06F 1/181 |
| 9,754,631 B2* | 9/2017 | Severson | ........... | G11B 33/1486 |
| 10,134,448 B2* | 11/2018 | Albrecht | ............ | G11B 33/1466 |
| 10,141,032 B2* | 11/2018 | Amin-Shahidi | ... | G11B 33/1466 |
| 10,262,698 B2* | 4/2019 | Amin-Shahidi | ...... | G11B 33/125 |
| 2003/0179489 A1* | 9/2003 | Bernett | .............. | G11B 33/1466 360/97.22 |
| 2005/0219740 A1* | 10/2005 | Repphun | .............. | G11B 33/121 360/97.18 |
| 2008/0088969 A1* | 4/2008 | Uefune | ................ | G11B 25/043 360/99.21 |
| 2011/0038076 A1* | 2/2011 | Hayakawa | ........... | G11B 25/043 360/97.16 |
| 2013/0170074 A1* | 7/2013 | Hayakawa | ........... | G11B 33/148 360/97.22 |
| 2013/0235488 A1 | 9/2013 | Andrikowich et al. | | |
| 2015/0294691 A1* | 10/2015 | Inaba | ...................... | G11B 5/84 360/97.22 |
| 2019/0066716 A1* | 2/2019 | Suzuki | ..................... | G11B 5/10 |

FOREIGN PATENT DOCUMENTS

| | | | | |
|---|---|---|---|---|
| JP | 05062446 A | * | 3/1993 | |
| JP | 2006085776 A | * | 3/2006 | |
| JP | 5049017 B2 | * | 10/2012 | ........... G11B 25/043 |

\* cited by examiner

METHOD AND APPARATUS WITH MULTIPLE CAVITIES

SUMMARY

Various example embodiments are directed to apparatuses and related methods involving the evacuation, filling, and sealing of a dual cavity apparatus. Such embodiments may be employed to provide such evacuation and filling with closely-spaced cavity walls or covers. This evacuation and fill approach is carried out through openings that provide access to the cavities, utilizing spacers to maintain separation between components such as walls or covers that may otherwise collapse or hinder the evacuation or resulting fill. Once filled, seals are applied to the openings to seal the gas within the cavity or cavities. A variety of different types of cavities, such as a disc drive cavity with an evacuation/fill opening therein, can be evacuated, filled with a gas and finally sealed in this manner. These approaches provide flexible manufacturing implementations and address issues that may relate to, for example, mitigating the escape of the gas into or migration of gas out of the dual cavity apparatus over an extended period of time, forming an extended permeability path to mitigate escape of the gas from the dual cavity apparatus, and fully evacuating an atmosphere from the cavities to prevent the mixing of such an atmosphere and gas filled in the sealed cavities.

Various embodiments of the present disclosure are directed to an apparatus including a base deck having walls that define a first cavity within the base deck. A first cover is coupled to the base deck thereby enclosing the first cavity, and a first opening in the first cover provides access to the first cavity. A first seal placed over the first opening, in conjunction with the first cover, seals the first cavity. A second cover, coupled to the base deck, is offset from the first cover and has a second opening. The second opening is sealed by a second seal, and the second seal in conjunction with the second cover seals the first cavity and a second cavity between the first cover and the second cover. The apparatus further includes a plurality of spacers between the first cover and the second cover, the plurality of spacers maintain the offset between the first and second covers. In more specific embodiments, the second opening of the second cover, prior to the second seal being placed over the second opening, facilitates a vacuum being drawn in the second cavity. In response to the vacuum being drawn in the second cavity, the spacers maintain a spacing between the first and second covers by providing an opposing force in response to the vacuum drawing the first and second covers toward one another.

One or more of these embodiments may be particularly applicable, for example, to disc drives in which a first cavity between a base deck and a first cover, and a second cover between the first cover and a second cover, are hermetically sealed with a low-density gas therein. The resulting low-density gas in the cavities facilitates reduced power usage during operation of the disc drive components within the cavity. The low-density atmosphere further facilitates the transfer of heat from components of the disc drive to the base deck and covers, which is then dissipated into an external environment. In this context, aspects of the present disclosure prevent external atmosphere with undesirable atmospheric characteristics (e.g., friction and heat insulating aspects of air) from permeating into the first and second cavities by evacuating the cavity, filling the cavity with the low-density gas, and establishing a hermetic seal around the cavities of the disc drive. The second cavity and the sealed openings of the first and second covers form an extended permeability pathway that essentially eliminates the flow of the external atmosphere into the first cavity, and the flow of the low-density gas from within the first cavity into the external atmosphere.

Various example embodiments are further directed to methods of manufacturing a sealed dual cavity apparatus. A first cover is coupled to a base deck thereby defining a first cavity therebetween. A first opening in the first cover is sealed with a first seal, thereby sealing an atmosphere in the first cavity. A second cover is coupled to the base deck and offset from the first cover to define a second cavity, and has a second opening. A plurality of spacers are provided between the first cover and the second cover, and each of the spacers maintain the offset between the first and second covers while a vacuum is drawn in the second cavity between the first and second covers through the second opening. In yet further embodiments, the spacers provide an opposing force, to a compression force placed between the first and second covers, which mitigates movement of the first and second covers toward one another.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
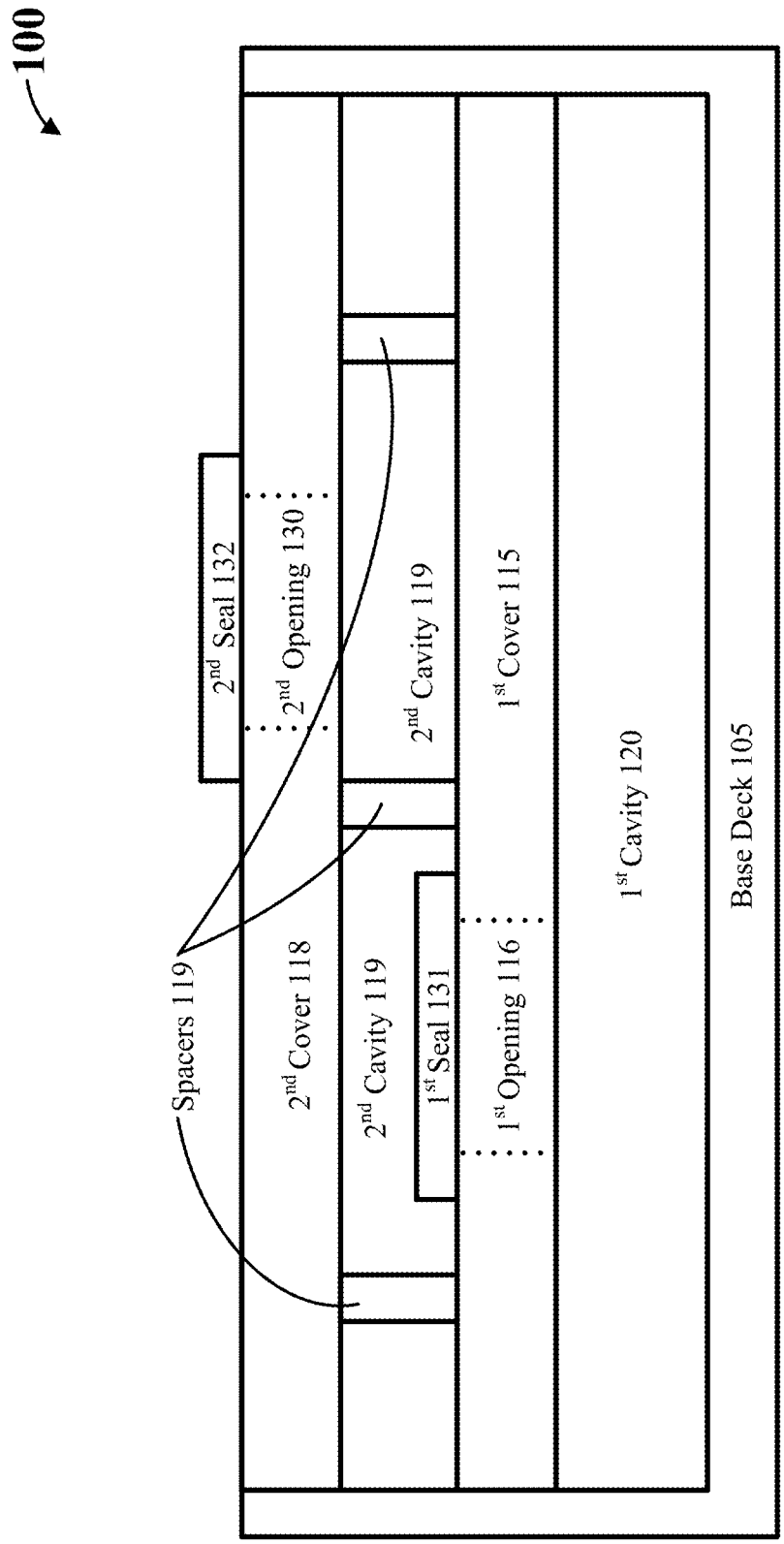
FIG. 1 is a cross-sectional side-view of an apparatus, consistent with various aspects of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of dual-cavity devices, where the cavities are evacuated, filled with a gas, and sealed with the gas therein. Specific embodiments are believed to be particularly beneficial to the manufacture and implementation of sealed disc drives, such as those containing low-density atmosphere. While the present disclosure is not necessarily so limited, various aspects of the disclosure may be appreciated through a discussion of examples using this context.

Various example embodiments are directed to apparatuses and related methods involving the evacuation, filling with a gas, and sealing of a dual cavity apparatus. This evacuation and fill approach is carried out through openings in first and second covers that provide access to the respective cavities. Once each of the cavities has been evacuated and subsequently filled with the gas, seals are applied to the respective openings of each cavity to seal the gas therein. A variety of different types of cavities, such as a disc drive cavity with an evacuation/fill opening therein, can be evacuated, filled and sealed in this manner, providing flexible manufacturing implementations and addressing issues that may relate, for example, to evacuating an atmosphere from a cavity by utilizing spacers between first and second covers to prevent contact between the covers during evacuation of an atmosphere therebetween. Contact between the covers during evacuation of the cavity therebetween may otherwise prevent complete evacuation of the cavity, in which context aspects of the disclosure mitigate mixing of pre-existing atmosphere with the injected gas and negatively affect the atmospheric characteristics of the gas.

Various embodiments of the present disclosure are directed to an apparatus including a base deck having walls that define a first cavity within the base deck. A first cover is coupled to the base deck thereby enclosing the first cavity. A first opening in the first cover provides access to the first cavity, and is sealed by a first seal placed over the first opening, which in conjunction with the first cover, seals the first cavity. A second cover, coupled to the base deck, is offset from the first cover and has a second opening. The second opening is sealed by a second seal, and with the second cover seals the first cavity and a second cavity between the first cover and the second cover. A plurality of spacers between the first cover and the second cover maintain the offset between the first and second covers. In more specific embodiments, the second opening in the second cover, prior to the second seal being placed over the second opening, facilitates drawing of a vacuum in the second cavity. The plurality of spacers maintain the offset between the first and second covers, while the vacuum is drawn in the second cavity, by providing an opposing force in response to the vacuum drawing the first and second covers toward one another. By maintaining the offset between the first and second covers, contact between the first and second covers is mitigated, which could otherwise seal off portions of the cavity from the first opening and prevent complete evacuation of the cavity.

One or more of these embodiments may be particularly applicable, for example, to disc drives in which cavities between a base deck and one or more covers are hermetically sealed with a low-density atmosphere in each of the cavities. In such embodiments, the low-density atmosphere may be used to facilitate reduced power requirements for a data storage device. In this context, aspects of the present disclosure prevent external atmosphere with undesirable atmospheric characteristics (e.g., friction and heat insulating aspects of air) from permeating into the first and second cavities by evacuating the cavity, refilling the cavity with the low-density gas and establishing a hermetic seal around the disc drive. The second cavity and the sealed openings of the first and second covers form an extended permeability pathway to the first cavity that facilitates the hermetic seal and essentially eliminates the flow of an external atmosphere into the first cavity. The permeability pathway further facilitates proper operation of the disc drive over its operational lifespan by hermetically sealing an atmosphere injected into the cavities, after a vacuum is drawn within each of the cavities. The atmosphere filled into the cavities may include one or more of a plurality of gases intended to give the atmosphere desirable characteristics. For example, improved heat transfer out of the disc drive (high heat transfer co-efficient) and reduced atmospheric resistance (low-density). Such characteristics optimize the performance of the disc drive by reducing power consumption necessary to rotate the storage medium in the gas, and by reducing operating temperature of the disc drive which may otherwise limit performance characteristics of the disc drive (e.g., seek times).

In various embodiments of apparatuses consistent with the present disclosure, the first cover, with the first seal removed, facilitates drawing a vacuum in the first cavity via the first opening. Similarly, the second cover, with the second seal removed, facilitates drawing a vacuum in the second cavity via the second opening. While the vacuum is drawn in the second cavity, the plurality of spacers maintain spacing between the first cover (or the first seal) and second covers. In more specific embodiments, the plurality of spacers include spacers that extend from a surface of the first cover and peripherally around the first opening, thereby mitigating movement of the first and second covers toward one another in response to a vacuum being drawn in the second cavity.

The plurality of spacers, in accordance with various embodiments, may include spacers that extend from a surface of the first cover that faces the second cover and maintains the spacing between the first and second cover by contacting the second cover and mitigating movement of the first and second covers toward one another. In conjunction with the above embodiment, or standalone, the plurality of spacers may include spacers that extend from a surface of the second cover that faces the first cover and maintains the spacing by contacting the first cover and mitigating movement of the first and second covers toward one another. In yet further more specific embodiments the spacers may also extend from a surface of the first seal toward the second cover and maintain the spacing by contacting the second cover and mitigating movement of the first seal and second cover toward one another.

In many embodiments, the second cavity and/or the first cavity is filled with an atmosphere with a pressure less than 0.5 atm therein. The first seal in conjunction with the base deck and the first cover temporarily seals the atmosphere within the first cavity, and the second seal in conjunction with the base deck, the first cover, and the second cover permanently seals the atmosphere within the first and second cavities. In embodiments specific to disc drive applications, the first seal may be implemented to temporarily seal the atmosphere within the first cavity while disc drive components within the first cavity are operationally tested. In such embodiments, the first cover can be removable allowing the disc drive components to be re-worked where one or more components fail operational testing, mitigating scrap costs during manufacturing. The second (permanent) cover may not be removable, and accordingly it is desirable to determine the proper operation of the disc drive components prior to coupling the second cover to the base deck. Various aspects of this disclosure facilitate such a determination or other evaluation of the disc drive components.

Other embodiments consistent with the present disclosure may further include a plurality of channels that extend between adjacent ones of the plurality of spacers, the plurality of channels facilitating the drawing of a vacuum throughout the second cavity. In yet further embodiments, the channels may be cut into a surface of the first and/or second cover, which define the second cavity. These channels continue to facilitate drawing a vacuum in the second cavity even if the vacuum causes the first and second covers to contact one another.

Various example embodiments are directed to methods including the steps of coupling a first cover to a base deck, the first cover and the base deck defining a first cavity therein. A first opening in the first cover is sealed with a first seal thereby sealing an atmosphere in the first cavity. A second cover is coupled to the base deck and offset from the first cover, the second cover having a second opening. Spacers are provided between the first cover and the second cover and maintain a spacing between the first and second covers while drawing a vacuum in a second cavity between the first and second covers via the second opening. In yet further embodiments, the spacers provide an opposing force, in response to compression of the spacers as the vacuum in the second cavity draws the first and second covers towards one another, which mitigates movement of the first and second covers relative to one another. The spacers thereby maintain the continuity of the second cavity during its evacuation, facilitating complete evacuation of an atmosphere within the cavity.

Further methods consistent with the present disclosure include the step of, prior to sealing the first opening, evacuating gas from the first cavity and subsequently filling the first cavity with a first gas. In such an embodiment, sealing the first opening includes sealing the first gas in the first cavity. After drawing the vacuum in the second cavity, the second cavity is filled with a second gas, and the second gas is sealed in the second cavity by coupling a seal to the second opening.

In methods consistent with the above and specifically directed to assembling disc drives, the base deck includes disc drive componentry, and the method further includes, after sealing the first opening and prior to coupling the second cover to the base deck, operationally testing the disc drive componentry. The steps of coupling the second cover, filling the second cavity and using the plurality of spacers are carried out in response to the operational testing indicating proper operation of the disc drive componentry. Where the operational testing indicates improper operation of the disc drive componentry, prior to coupling the second cover to the base deck, the first cover is decoupled from the base deck and the disc drive componentry is re-worked to correct the undesired operational characteristic of the disc drive componentry. After re-working the disc drive componentry, the steps of evacuating the first cavity, filling the first cavity, and sealing the opening in the first cover are repeated and the disc drive componentry is re-tested.

Turning now to the figures, various embodiments of the present disclosure are presented by way of the illustrations. FIG. 1 is a cross-sectional side-view of an apparatus 100, consistent with various aspects of the present disclosure. The apparatus 100 includes a base deck 105 having walls, and a first cover 115 with a first opening 116. The first cover 115 is coupled to the base deck 105, and in conjunction with the base deck walls, defines a first cavity 120. The first opening 116 is sealed by a first seal 131, and with the first cover 115, acts to seal the first cavity 120. A second cover 118 is coupled to the base deck 105 and offset from the first cover 115. The second cover 118 includes a second opening 130. A second seal 132 seals the second opening 130, and in conjunction with the second cover 118 seals the first cavity 120 and a second cavity 119 defined by the first cover 115, the second cover 118, and sidewalls of the base deck 105. A plurality of spacers 119, located between the first cover 115 and the second cover 118, maintain spacing between the first and second covers.

Figure 2A:
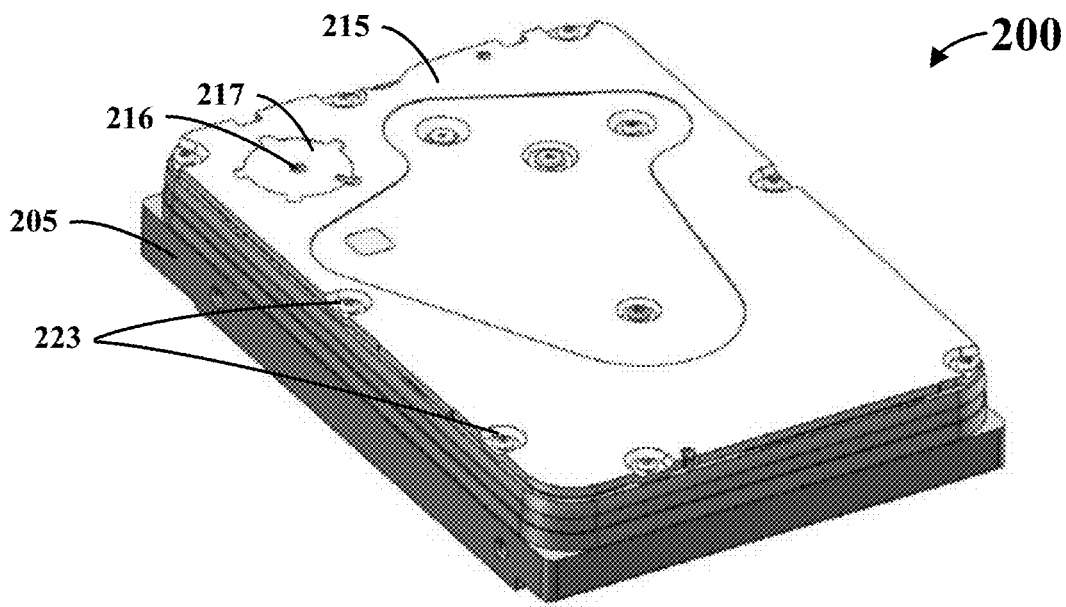
FIG. 2A is an isometric view of a partially-assembled disc drive apparatus, consistent with various aspects of the present disclosure.

FIG. 2A is an isometric view of a partially-assembled disc drive apparatus 200, consistent with various aspects of the present disclosure. The partially-assembled disc drive apparatus 200 including a base deck 205 coupled (via a hermetic seal) to a first cover 215 that forms a cavity therebetween. In many embodiments of the present disclosure the cavity houses disc drive components. The first cover 215 includes a first opening 216 that extends through the first cover, providing access to an atmosphere within the cavity. The first cover 215 further includes one or more protrusions 217. It is to be further understood that the first cover 215 (or a second cover) may include one or more channels, in addition to the one or more protrusions 217, or in substitution therefore. The second cover may also include the one or more protrusions and/or channels, instead of the first cover having such protrusions and/or channels. The one or more protrusions 217 of the first cover 215 provide a spacing (distance) between adjacent surfaces of the first cover and a second cover that is coupled to the base deck 205.

Figure 2B:
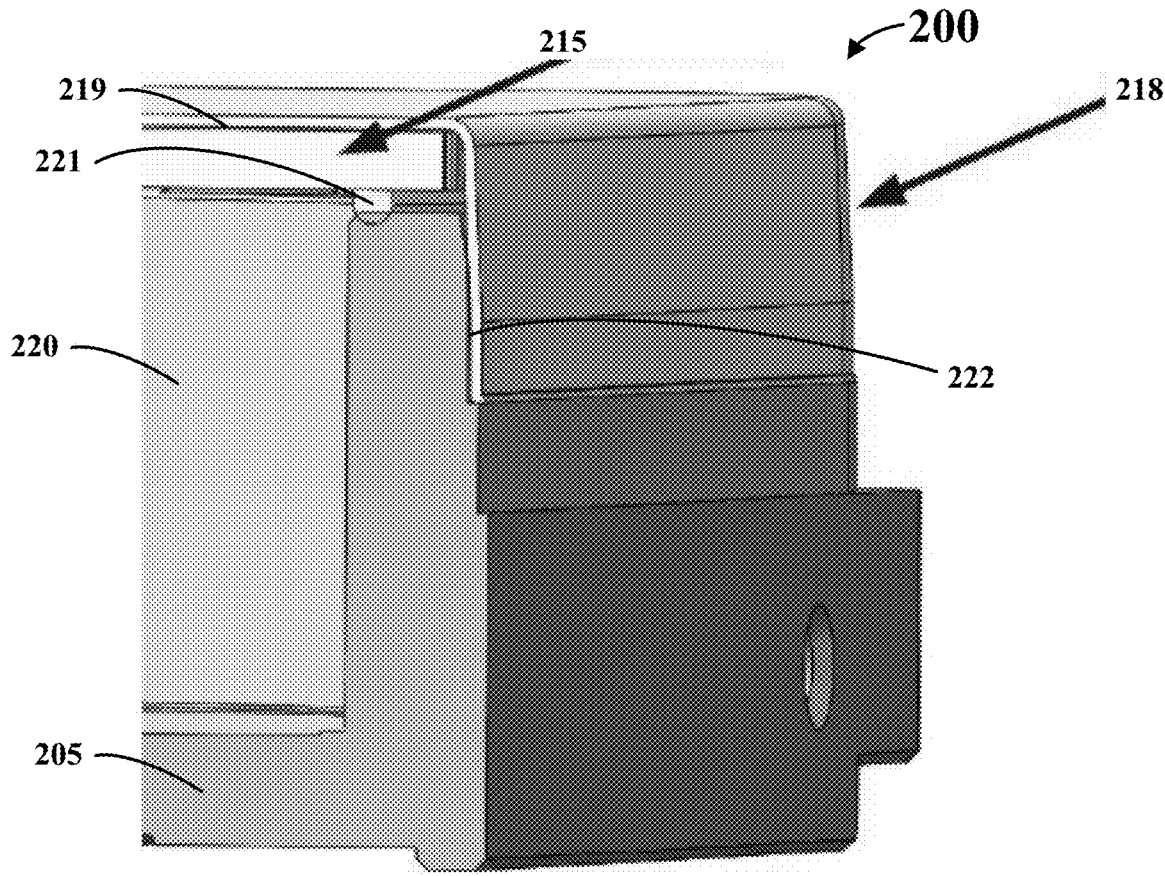
FIG. 2B is a cross-sectional view of the partially-assembled disc drive apparatus of FIG. 2A with a second cover, consistent with various aspects of the present disclosure.

FIG. 2B is a cross-sectional view of the partially-assembled disc drive apparatus 200 of FIG. 2A with a second cover 218 assembled thereto, consistent with various aspects of the present disclosure. The first cover 215 and second cover 218 may be coupled to the base deck 205 using one or more well-known coupling techniques, including adhesive, welding, fasteners in conjunction with a sealing gasket, among others. In the present embodiments, the second cover 218 is sealed to the base deck along a joint 222. The second cover 218, once coupled to the base deck 205, seals an atmosphere (in conjunction with the first cover 215) within a first cavity 220 and a second cavity 219. The second cover 218 acts as a back-up in the case that the first cover 215 provides an insufficient seal to maintain a desired amount of low-density atmosphere within the first cavity 220. The use of dual covers similarly prevents egress of an external atmosphere into the cavity 220. Such embodiments are particularly useful for sealing low-density atmospheres within the cavities, which exhibit characteristics including increased permeability through materials such as epoxies and other porous materials.

During assembly of the disc drive apparatus 200 of FIGS. 2A-2B, a first cover 215 is coupled to the base deck 205 using fasteners 223 along a periphery of the base deck. A gasket 221 extending around the periphery of a first cavity 220 is compressed between the first cover 215 and the base deck 205 by the fasteners 223 to hermetically seal an atmosphere within the first cavity. An existing atmosphere within the first cavity 220 is evacuated from the first cavity via a first opening 216. The first opening 216 provides access to the existing atmosphere within the first cavity, and the evacuation of the existing atmosphere forms a vacuum therein. A low-density atmosphere is then injected into the first cavity via the first opening 216, after which a first seal is placed over the first opening, and in conjunction with the first cover 215, seals the first cavity 220.

Low-density atmospheres, such as helium, are capable of permeating through materials (overtime), including rubbers, plastics, porous metals, among others. Accordingly, embodiments of the present disclosure maintain an amount of low-density atmosphere for an extended period of time (e.g., up to five years) by forming a second cavity 219 between a base deck 205 and a second cover 218. This secondary cover decreases the likelihood that the low-density atmosphere will escape from both the first cavity 220, and subsequently the second cavity 219.

After the first cavity 220 has been sealed, a second cover 218 is placed over the first cover 215 and is coupled to the base deck 205. The second cover 218 may be coupled to form a hermetic seal using one or more fastening techniques discussed above. An offset is left between the first cover 215 and the second cover 218 to form second cavity 219. A second opening in the second cover provides access to an existing atmosphere within the second cavity. An existing atmosphere within the second cavity 219 is evacuated from the second cavity 219 via the second opening, forming a vacuum therein. Similar to the first cavity, a low-density atmosphere is then injected into the second cavity 219 via the second opening, after which a second seal is placed over the second opening.

During evacuation of the second cavity 219, the first and second covers 215 and 218 may be subject to forces that would otherwise tend to draw the covers to one another in response to the vacuum being formed in the second cavity. Absent the protrusions 217 that extend through the second cavity 219, the first and second covers 215 and 218 may collapse onto one another. This collapse and subsequent contact may prevent the vacuum being drawn within the second cavity 219 from reaching all the atmosphere therein. The protrusions 217 thereby facilitate complete evacuation of the second cavity 219 by mitigating contact of the adjacent surfaces of the first and second covers 215 and 218. Moreover, the protrusions facilitate tight spacing between the covers, which can further facilitate a reduced overall height of the componentry. In many embodiments, complete evacuation of the second cavity 219 is necessary to guarantee the purity of a low-density atmosphere later injected into the second cavity before sealing. Where the atmosphere in the second cavity 219 includes impurities, the impurities may eventually permeate through the seal over the first opening 216 or through the first cover 215 into the first cavity 220. In embodiments where the first cavity 220 houses disc drive components, such impurities can negatively impact the operation of the disc drive components.

The first and second covers form an extended permeability path that substantially mitigates the escape of low-density atmosphere from within the first cavity 220, or an external atmosphere into the first cavity. It has been discovered that such extended permeability paths can maintain over 90% of a low-density atmosphere within the first cavity for more than five years.

Figure 3A:
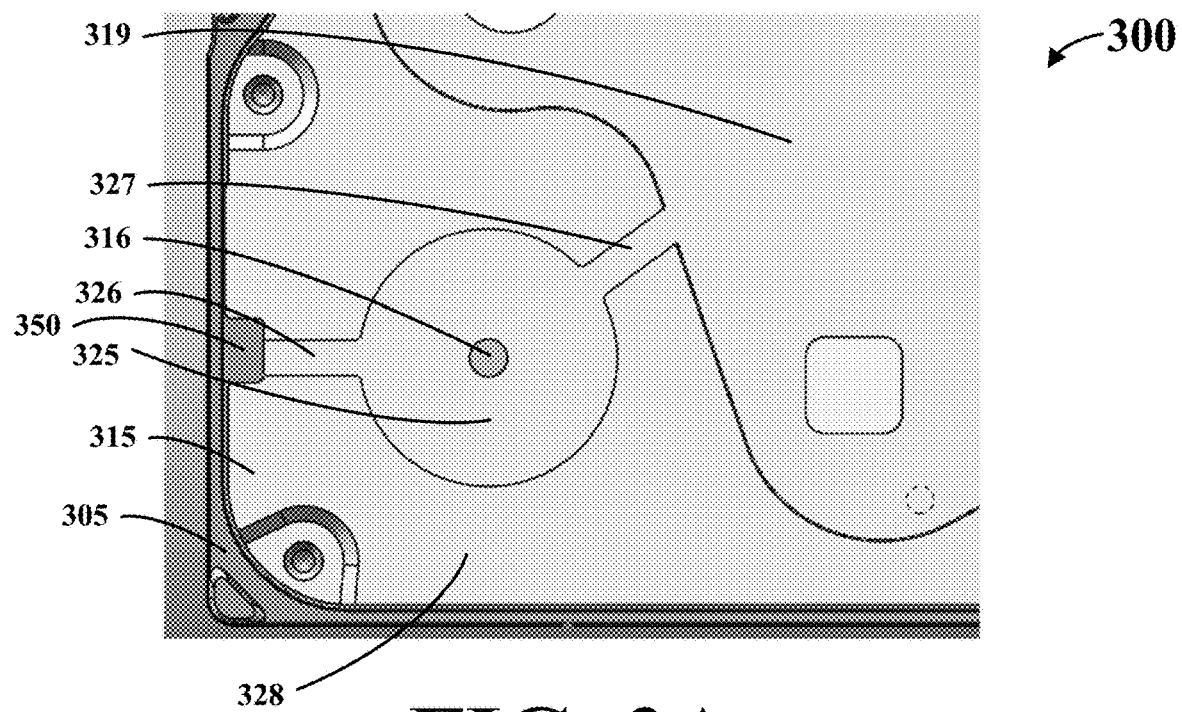
FIG. 3A is a top view of a partially-assembled disc drive apparatus, consistent with various aspects of the present disclosure.

FIG. 3A is a top view of a partially-assembled disc drive apparatus 300, consistent with various aspects of the present disclosure. A first cover 315 is coupled to a base deck 305, forming a first cavity there between. A first opening 316, located within an indentation 325 (relative to a top surface 328), provides access to the first cavity. First and second channels 326 and 327, respectively, extend from the indentation 325 to an interstitial space 350 (between an outer periphery of the first cover 315 and an inner periphery of the base deck 305), and a second cavity 319, respectively.

Figure 3B:
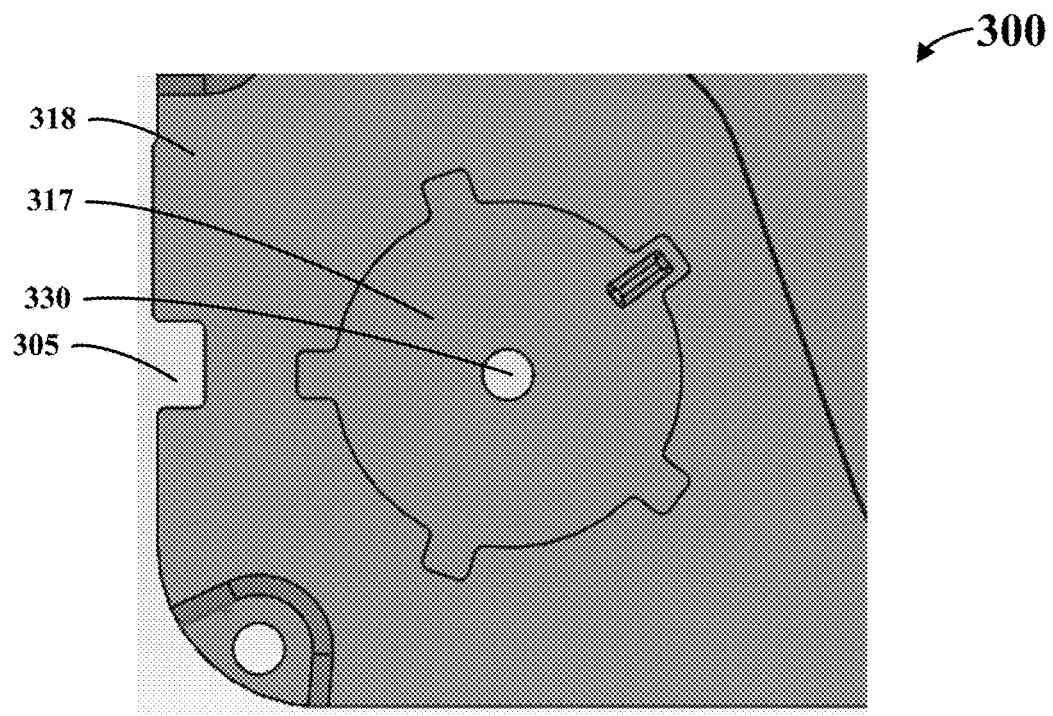
FIG. 3B is a top view of the partially-assembled disc drive apparatus of FIG. 3A with a second cover, consistent with various aspects of the present disclosure.

FIG. 3B is a top view of the partially-assembled disc drive apparatus of FIG. 3A, consistent with various aspects of the present disclosure. A second cover 318 is coupled to the base deck 305, with the first cover located there between. In the present embodiment, a second opening 330 aligns with a first opening of the first cover. A protrusion 317 extends from a surface of the second cover 318 adjacent the first cover and extends into contact with (or near to) the adjacent surface of the first cover. During an evacuation of an atmosphere within the second cavity 319 via the opening 330, the protrusion 317 on the final cover 318, in conjunction with the first and second channels 326 and 327 prevent the first and second covers from collapsing onto one another and isolating the second cavity 319 from the second opening 330. Specifically, the protrusion 317 acts to maintain separation between the first and second covers while drawing a vacuum in the second cavity 319 there between. As noted above, this can facilitate complete evacuation and close spacing of the covers. Where the protrusion 317 comes into contact with the top surface 328 of the first cover 315 (e.g., in response to a vacuum or other force drawing the first cover 315 into contact with the protrusion 317), the second channel 327 provides access between the second opening 330 and the second cavity 319 to draw a complete vacuum therein. The first channel 326 facilitates the drawing of a vacuum pressure within the interstitial space 350. After the vacuum has been drawn in the second cavity 319 and the interstitial space 350, a gas is injected into the second cavity and the interstitial space, and the second opening 330 is sealed similarly to the first opening 316.

Figure 4:
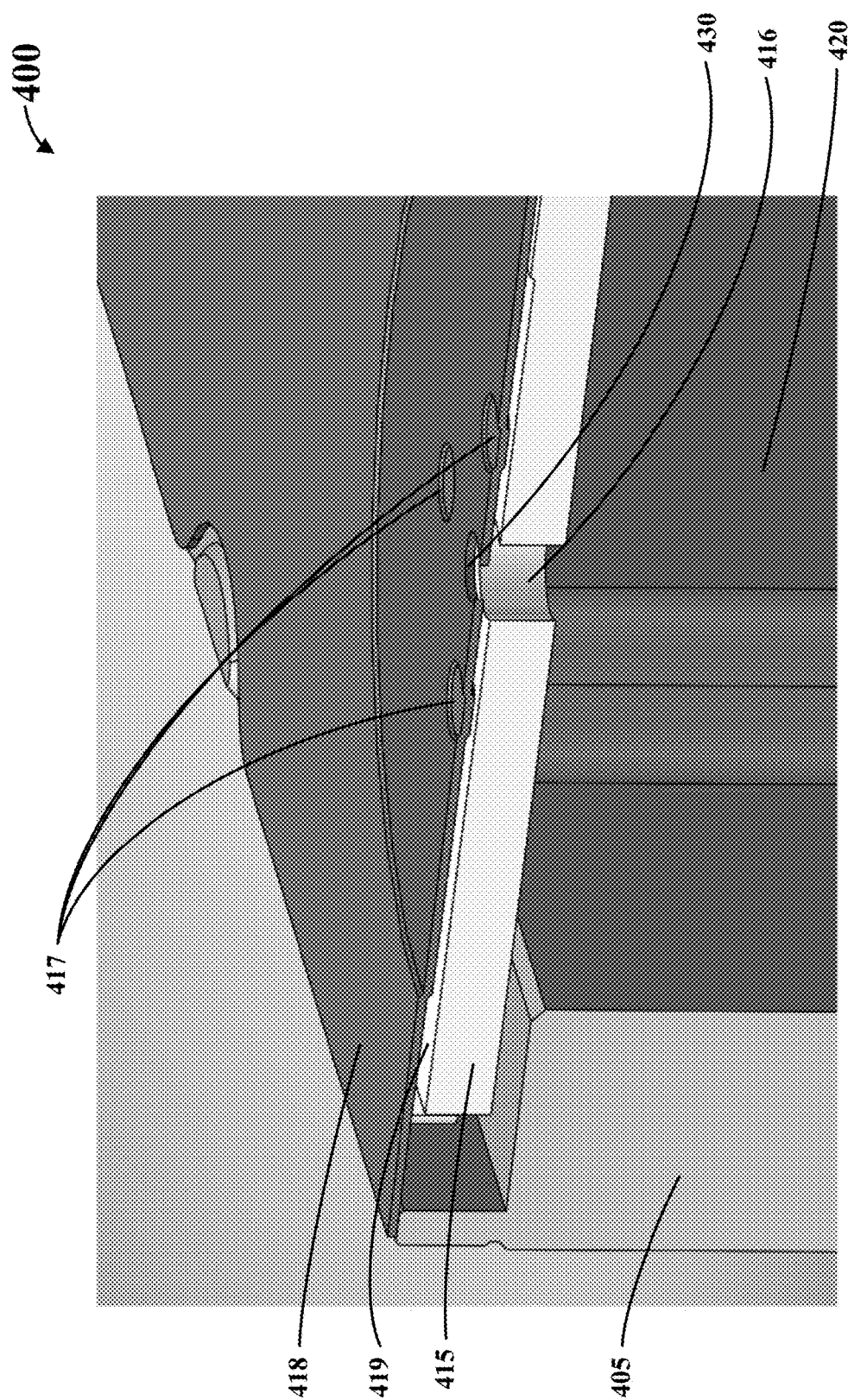
FIG. 4 is a cross-sectional, isometric view of a partially-assembled disc drive apparatus, consistent with various aspects of the present disclosure.

FIG. 4 is a cross-sectional, isometric view of a partially-assembled disc drive apparatus 400, consistent with various aspects of the present disclosure. A first cavity 420 is enclosed by a base deck 405 along five sides and a first cover 415 along a top of the cavity. A first opening 416 in the first cover 415 provides access to the first cavity 420 after the first cover is sealed to the base deck 405. After evacuating an atmosphere from the first cavity 420 via the first opening 416 and injecting a gas therein, the first opening is sealed thereby hermetically sealing the gas within the first cavity. A second cover 418 is sealed to the base deck 405, thereby forming a second cavity 419 between the first cover 415, second cover, and base deck. A second opening 430 provides access to the second cavity 419, which allows for the evacuation of an atmosphere within the second cavity and for the gas to be injected into the second cavity through the second opening. Spacers 417 extend from a surface of the second cover 418 adjacent the first cover 415 and into (or nearly into) contact with the adjacent surface of the first cover. During evacuation of the atmosphere within the second cavity 419, the spacers 417 maintain an offset between the first and second covers 415 and 418, respectively, in response to vacuum forces that draw the covers together and can impede complete evacuation of the atmosphere within the second cavity. The spacers 417 allow the atmosphere within the second cavity 419 to be evacuated along evacuation paths adjacent the spacers.

Based upon the above discussion and illustrations, those skilled in the art will readily recognize that various modifications and changes may be made to the various embodiments without strictly following the exemplary embodiments and applications illustrated and described herein. For example, the various embodiments of the spacers/protrusions can take a number of different shapes, dimensions, and positions relative to first and second openings of first and second covers of the apparatus then the configurations presented for illustrative purposes in FIGS. 1, 2A-2B, 3A-3B and 4. Such modifications do not depart from the true spirit and scope of various aspects of the invention, including aspects set forth in the claims.

What is claimed is:

1. An apparatus comprising:
a base deck having a bottom and walls that define a first cavity within the base deck;
a first cover coupled to the walls of the base deck and having a first opening;
a first seal that seals the first opening and, with the first cover and the base deck, seals the first cavity;
a second cover coupled to the walls of the base deck and offset from the first cover, the second cover having a second opening;
a second seal that seals the second opening and, with the walls and the first and second covers, seals the first cavity and a second cavity defined by the walls, the first cover and the second cover; and
a plurality of spacers between the first cover and the second cover, the plurality of spacers being configured and arranged to maintain spacing between the first and second covers.

2. The apparatus of claim 1, wherein
the second cover is configured and arranged to, with the second seal removed, facilitate drawing of a vacuum in the second cavity via the second opening; and
each of the plurality of spacers is configured and arranged to maintain spacing between the first and second covers while the vacuum is drawn by providing a force, under compression of the spacer between the first and second covers, that mitigates movement of the first and second covers toward one another.

3. The apparatus of claim 1, wherein
the first cover is configured and arranged to, with the first seal removed, facilitate drawing of a vacuum in the first cavity via the first opening;
the second cover is configured and arranged to, with the second seal removed, facilitate drawing of a vacuum in the second cavity via the second opening; and
the plurality of spacers are configured and arranged to maintain spacing between the first and second covers while the vacuum is drawn in the second cavity.

4. The apparatus of claim 1, wherein
the base deck walls form a continuous sidewall extending around the first cavity;
the first cover and the second cover are coupled to the sidewall; and
the plurality of spacers are configured and arranged to maintain spacing between the first seal and the at least one of the second cover and the second seal while a vacuum is drawn in the second cavity.

5. The apparatus of claim 1, wherein the plurality of spacers include spacers that extend from a surface of the first cover that faces the second cover and that are configured and arranged to maintain the spacing by contacting the second cover and mitigating movement of the first and second covers toward one another.

6. The apparatus of claim 5, wherein the plurality of spacers include spacers that extend from a surface of the second cover that faces the first cover and that are configured and arranged to maintain the spacing by contacting the first cover and mitigating movement of the first and second covers toward one another.

7. The apparatus of claim 6, wherein
the first cover and the second cover are coupled to the walls of the base deck and have upper surfaces that offset from one another in stacked parallel planes, the respective openings being in the upper surfaces and laterally offset from one another, relative to the parallel planes, and
the plurality of spacers include spacers that extend from a surface of the first seal toward the second cover and that are configured and arranged to maintain the spacing by contacting the second cover and mitigating movement of the first seal and second cover toward one another.

8. The apparatus of claim 5, wherein the plurality of spacers include spacers that extend from a surface of the first seal toward the second cover and that are configured and arranged to maintain the spacing by contacting the second cover and mitigating movement of the first seal and second cover toward one another.

9. The apparatus of claim 1, wherein the plurality of spacers include spacers that extend from a surface of the second cover that faces the first cover and that are configured and arranged to maintain the spacing by contacting the first cover and mitigating movement of the first and second covers toward one another.

10. The apparatus of claim 1, wherein the plurality of spacers include spacers that extend from a surface of the first seal toward the second cover and that are configured and arranged to maintain the spacing by contacting the second cover and mitigating movement of the first seal and second cover toward one another.

11. The apparatus of claim 1, wherein the plurality of spacers are configured and arranged to prevent contact between surfaces of the first and second cover that face one another, in response to a vacuum being drawn in the second cavity.

12. The apparatus of claim 1, wherein the plurality of spacers include spacers that extend from a surface of the first cover and peripherally around the first opening and being configured and arranged to mitigate movement of the first and second covers toward one other in response to a vacuum being drawn in the second cavity.

13. The apparatus of claim 1, further including a plurality of channels that extend between adjacent ones of the plurality of spacers, the plurality of channels being configured and arranged to facilitate the drawing of a vacuum throughout the second cavity.

14. The apparatus of claim 1, wherein
the first cavity includes an atmosphere with a pressure less than 0.5 atm therein, and
the first seal is configured and arranged with the base deck and the first cover to temporarily seal the atmosphere within the first cavity.

15. The apparatus of claim 1, wherein
the first and second cavities include an atmosphere with a pressure less than 0.5 atm therein,
the first seal is configured and arranged with the base deck and the first cover to temporarily seal the atmosphere within the first cavity, and
the second seal is configured and arranged with the base deck, the first cover, and the second cover to permanently seal the atmosphere within the first and second cavities.

16. An apparatus comprising:
a base deck having walls that define a first cavity within the base deck;
a first cover configured and arranged to couple to the base deck for enclosing the first cavity, and having a first opening;
a second cover configured and arranged to couple to the base deck in a position that is offset from the first cover when the first cover is coupled to the base deck, the second cover having a second opening and being configured and arranged with the first cover and the base deck to define a second cavity between the first and second covers; and a plurality of spacers between the first cover and the second cover, the plurality of spacers being configured and arranged to maintain spacing between the first and second covers.

17. The apparatus of claim 16, wherein the walls form a continuous sidewall that extend around and laterally bound the first cavity, the first cover and the second cover are configured to couple to the base deck by coupling to the sidewall, further including a first seal that is configured and arrange to seal the first opening and to, with the first cover, seal the first cavity, wherein the plurality of spacers are configured and arranged to maintain the spacing between the first and second covers while a vacuum is drawn in the second cavity.

* * * * *